US007447850B1

(12) United States Patent
Del Rosso et al.

(10) Patent No.: US 7,447,850 B1
(45) Date of Patent: Nov. 4, 2008

(54) ASSOCIATING EVENTS WITH THE STATE OF A DATA SET

(75) Inventors: Michael Del Rosso, Laguna Hills, CA (US); Nicholas Burke, San Francisco, CA (US); Chris Insinger, Sunnyvale, CA (US); Musa Mustafa, Fullerton, CA (US)

(73) Assignee: Quantum Corporation, San Jose, CA (US)

( * ) Notice: Subject to any disclaimer, the term of this patent is extended or adjusted under 35 U.S.C. 154(b) by 363 days.

(21) Appl. No.: 10/960,331

(22) Filed: Oct. 5, 2004

Related U.S. Application Data

(60) Provisional application No. 60/509,120, filed on Oct. 5, 2003.

(51) Int. Cl.
 G06F 12/12 (2006.01)
 G06F 12/02 (2006.01)
(52) U.S. Cl. .................................. 711/156; 711/162
(58) Field of Classification Search ................. 711/156, 711/162
 See application file for complete search history.

(56) References Cited

U.S. PATENT DOCUMENTS

| 5,008,786 | A | 4/1991 | Thatte |
| 5,086,502 | A | 2/1992 | Malcolm |
| 5,403,639 | A | 4/1995 | Belsan et al. |
| 5,479,654 | A | 12/1995 | Squibb |
| 5,819,020 | A | 10/1998 | Beeler, Jr. |
| 5,943,672 | A | 8/1999 | Yoshida |
| 6,158,019 | A | 12/2000 | Squibb |
| 6,170,063 | B1 | 1/2001 | Golding |
| 6,182,198 | B1 | 1/2001 | Hubis et al. |
| 6,202,136 | B1 | 3/2001 | Wikle et al. |
| 6,205,450 | B1 | 3/2001 | Kanome |
| 6,301,677 | B1 * | 10/2001 | Squibb ........................ 714/13 |
| 6,732,125 | B1 | 5/2004 | Autrey et al. |
| 7,043,503 | B2 * | 5/2006 | Haskin et al. ............... 707/200 |
| 2003/0159007 | A1 * | 8/2003 | Sawdon et al. .............. 711/154 |

OTHER PUBLICATIONS

International Search Report mailed Aug. 15, 2001, for PCT patent application No. PCT/US01/18564 filed on Jun. 6, 2001, 3 pages.

* cited by examiner

*Primary Examiner*—Kevin Ellis
*Assistant Examiner*—Hamdy S Ahmed
(74) *Attorney, Agent, or Firm*—Morrison & Foerster LLP

(57) ABSTRACT

In a data storage system, events are associated with the state of a data set at specific points in time, the data set being a collection of addressable storage that is modified by a host computer system writing to specific addresses, by capturing copies of writes made by the host to the data set, each copied write having write data and address. Sequence information is assigned to the captured writes to organize the captured writes in the time sequence in which the writes were captured. Absolute time information is assigned to each captured write. Each captured write is retained as an entry in a repository, the entry including write data, address, sequence information, and absolute time information. An event is associated to a specific entry in the repository. The association is retained for subsequent use.

43 Claims, 3 Drawing Sheets

ASSOCIATING EVENTS WITH THE STATE OF A DATA SET

CROSS-REFERENCE TO RELATED APPLICATION

This application claims priority of an earlier filed provisional application U.S. Provisional Application Ser. No. 60/509,120, titled INFORMATION SECURITY COORDINATED CONTINUOUS BACKUP AND RECOVERY PROTECTION, filed Oct. 5, 2003, which is incorporated herein by reference in its entirety.

BACKGROUND

1. Field

The present application generally relates to data storage systems, and, in particular, associating events with the state of a data set.

2. Related Art

Various data protection systems and schemes can be used to prevent the loss of data stored in a data storage system if the data storage system fails. One common data protection scheme is a snapshot-based scheme that involves periodically making a copy of the data being protected. For example, in a snapshot-based scheme, data in one or more data storages can be periodically copied to a backup storage media, such as tape or redundant array of independent/inexpensive disks (RAID). If a data storage being protected fails, then the data on the data storage being protected is reconstructed using the copy that was made to the backup storage media.

One shortcoming to a snapshot-based scheme, however, is that the data can only be reconstructed based on when the snapshots are taken (i.e., when the data on the data storage being protected is copied to the backup storage media). All instances of time between when the snapshots are taken are unprotected. Additionally, while the frequency of the snapshots can be increased to reduce the unprotected period of time that is vulnerable to data loss if the data storage being protected fails, the increased frequency of the snapshots presents data management, retention and protection issues, which may be particularly undesirable in a large data storage system.

SUMMARY

In one exemplary embodiment, events are associated with the state of a data set at specific points in time, the data set being a collection of addressable storage that is modified by a host computer system writing to specific addresses. Copies of writes made by the host to the data set are captured, each captured write having write data and address. Sequence information is assigned to the captured writes to organize the captured writes in the time sequence in which the writes were captured. Absolute time information is assigned to each captured write. Each captured write is retained as an entry in a repository, the entry including write data, address, sequence information, and absolute time information. An event is associated to a specific entry in the repository. The association is retained for subsequent use.

DETAILED DESCRIPTION

Figure 1:
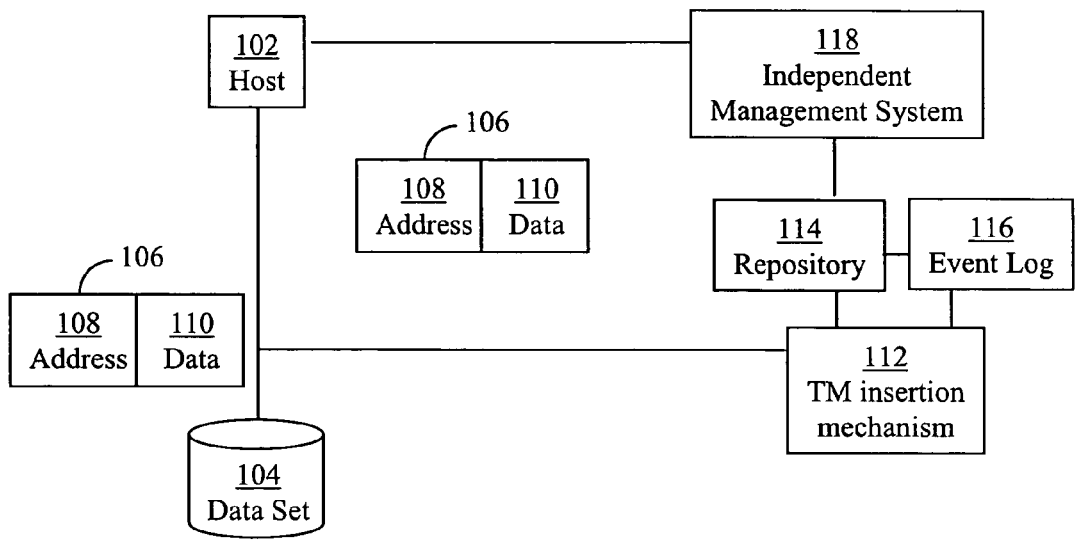
FIG. 1 is a block diagram of an exemplary data storage system.

With reference to FIG. 1, an exemplary data storage system includes a host 102 that modifies a data set 104, which is a collection of addressable storage, by writing to specific addresses. In one exemplary embodiment, copies of writes 106 made by host 102 to data set 104 are captured. As depicted in FIG. 1, each captured write 106 includes a write address 108 and data 110. It should be recognized that copies of writes 106 can be captured using any known technique, such as a filter driver, an appliance or switch disposed between host 102 and data set 104, software installed at host 102 (such as a volume manager), software installed in the storage device in which data set 104 resides, and the like.

As depicted in FIG. 1, in the present exemplary embodiment, copies of writes 106 made to data set 104 are captured by a temporal marker (TM) insertion mechanism 112. As will be described in more detail below, TM insertion mechanism 112 can provide for the purposeful association of security metadata with data protection and recovery metadata. This metadata is associated with unique and deliberate temporal positions in the lifecycle of the aging collection of data blocks (data set 104), which is organized and maintained by TM insertion mechanism 112. Thus, TM insertion refers to the deliberate association of metadata (from whatever source, information security (infosec) application, or a general application seeking to mark a backup recovery point for its data) with the aging collection of blocks being managed (data set 104). This association is automated and can trigger automated activities by TM insertion mechanism 112. As will be describe in more detail below, TM insertion is applied to and permits improved forensic analysis of malicious security events and recover of systems from security events.

It should be noted that temporal position of data blocks in a collection being managed (data set 104) is identified by two mechanisms. First, lifecycle changes of the data blocks being managed are organized in temporal order so it is obvious which changes were made in what time order relative to each other. Second, a timestamp is associated with every change that can also be used for comparison purposes to determine relative temporal order. This is of especial importance when disparate collections of data blocks are to be compared temporally, and they do not have the added benefit of having an absolute relative temporal position to each other, or even when comparing data blocks in completely separate instantiations of a continuous backup system, which can have mechanisms to maintain accurate absolute timestamps for such comparison purposes.

Figure 2:
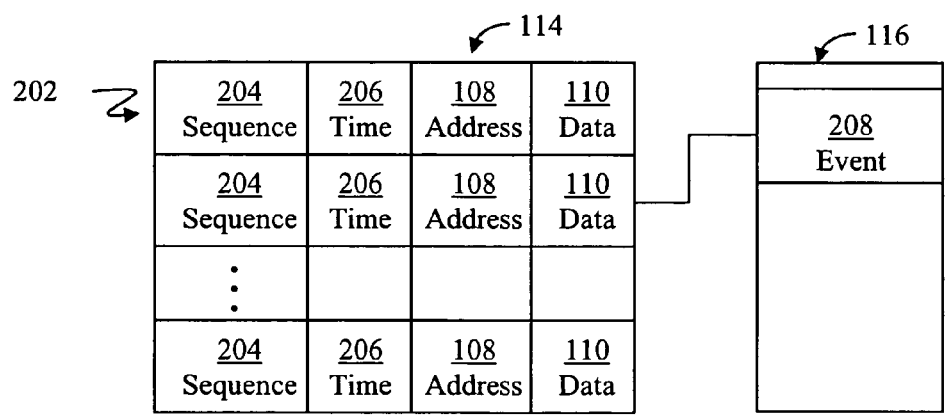
FIG. 2 depicts an exemplary format of a repository and an event log used in the exemplary data storage system depicted in FIG. 1.

In particular, in the exemplary embodiment depicted in FIG. 1, after copies of writes 106 are captured, sequence information is assigned to the captured writes to organize the captured writes 106 in the time sequence in which the writes were captured. Absolute time information is also assigned to each captured write 106. Each captured write 106 is retained as an entry in a repository 114. With reference to FIG. 2, in the present exemplary embodiment, an entry 202 in repository 114 includes write address 108, data 110, sequence information 204, and absolute time information 206. As depicted in FIG. 2, an event 208 is associated with a specific entry 202 in repository 114. The association is retained for subsequent use. Also, the retained associations can be organized for subsequent analysis.

With reference to FIG. 1, in the present exemplary embodiment, one or more events are retained in an event log 116. Information pertinent to the events can also be retained in event log 116. Thus, TM insertion mechanism 112 associates an event in event log 116 with an entry in repository 114. In particular, FIG. 2 depicts an event 208 in log 116 associated with a specific entry 202 in repository 114. It should be noted that the association between event 208 and entry 202 can be established using various known techniques, such as a pointer from an event 208 in event log 116 to entry 202 in repository 114.

With reference to FIG. 1, in one exemplary embodiment, TMs can be inserted into the block collection (i.e., the association between event log 116 and repository 114 can be established) via in-band or out-of band mechanisms into a continuous or journaled backup system. An in-band mechanism introduces a vendor-specific packet into the same stream by which the captured writes 106 are introduced into repository 114. An out-of band mechanism communicates with repository 114 using a mechanism other than the same stream by which the captured writes 106 are introduced into repository 114.

In a continuous backup system, the captured writes 106 retained in repository 114 are not overwritten by each other or any subsequently retained write. For example, if two subsequently captured writes 106 included writes addresses 108 to the same address in data set 104, both captured writes 106 are retained in repository 114 rather than just the most recently captured write 106, as would be the case in a non-continuous backup system. For a more detailed description of exemplary continuous backup systems and schemes, see U.S. patent application Ser. No. 09/588,242, titled DATA STORAGE SYSTEM AND PROCESS, which is incorporated herein by reference in its entirety; U.S. patent application Ser. No. 10/391,115, titled CREATING A BACKUP VOLUME USING A DATA PROFILE OF A HOST VOLUME, which is incorporated herein by reference in its entirety; and U.S. patent application Ser. No. 10/412,043, titled RECOVERY OF DATA ON A PRIMARY DATA VOLUME, which is incorporated herein by reference in its entirety.

As described above, TMs represent points in time (points in the continuous backup stream in the case of a continuous backup system) in the lifecycle of the collection of data blocks being protected (data set 104) that may be of interest (for a variety of reasons) and by marking them, permits subsequent action to be taken relevant to that point in time. A set of TMs are placed at points of time at which arbitrary metadata can be applied to the continuous backup system. The arbitrary metadata associated with this set of TMs can be used to represent events, such as an indicator that the data of a particular application is in a state that would be ideally suited as a future recovery point for that application (e.g., the start of a system upgrade, the start of an application install, notification of a security event, etc.) to assist in recovering data at that point in time, or in the forensic analysis of events.

In the present exemplary embodiment, when the continuous backup system reconstructs the collection of data blocks being managed (data set 104) at any given point in time, such an instantiation is referred to as a synthetic volume. The synthetic volume can represent data set 104 at a specific point in time as indicated by sequence information, absolute time information, or event associated with an entry in repository 114. Additionally, any number of synthetic volumes can be created and presented for use for a given collection of blocks being managed (data set 104) by the continuous backup system. For example, multiple synthetic volumes can be constructed and compared to determine which one represents a desired state of data set 104 at an initially unknown point in time.

An event associated with an entry in repository 114 can be generated by an application that also generates data that is associated with data set 104. For example, an entry in repository 114 can be generated by a database application that also stores records in data set 104. It should be noted that the application may know that at a specific point in time known only to it, the state of the collection of its data blocks being managed (data set 104) is of significant relevant only to it, and it wishes to mark that point in time for that collection in case it should ever like to have access to the collection in its exact state at the time it marked.

TM insertion mechanism 112 need not know that any particular time instance of a specific collection of blocks being managed (data set 104) is relevant to the application that actually owns the data. Additionally, TM insertion mechanism 112 need not know what the data in the collection of blocks (data set 104) means. Only the application, which TM insertion mechanism 112 is providing services for, need know what the data in the collection blocks (data set 104) means.

Thus, there are several mechanisms for the application side (which generates the data in the block collections being managed (data set 104)) to associates temporal markers. As briefly described above, it can do so via out-of-band signaling mechanisms that are provided, or it can do so in-band with the data stream of blocks being written via specific data commands that are provided. Additionally, TM insertion mechanism 112 identifies points in time at which the volume is in some meaningful state to the application. The TM can be associated with any moment in time, but ideally it is done in intelligent coordination with the application such that the application's data is in a state coherent to it that does not require any recovery or fix-up to be usable by that application if it needs to recover from it. Otherwise, the application may not be able to use the data reconstituted from a given instance in time.

Additionally, an event associated with an entry in repository 114 can be generated by an application that does not generate data that is associated with data set 104. For example, TM insertion mechanism 112 can be integrated with network, host, physical, and other intrusion detection systems or other information security (infosec) systems, such as firewalls, capable of generating alerts, for the purpose of coordinating information security significant events with data protection information for the purpose of recovery. The intrusion detection system generates TMs for the continuous or journaled backup system when the security system observes security events. The TMs facilitate forensic data analysis of the security event when used in conjunction with the continuous backup system. More generally, information security software can be integrated with data protection software via the mechanism of in-band or out-of-band TMs.

As described above, a synthetic volume can be created for a given collection of blocks that represents data set 104 at a specified point in time. Thus, in one exemplary embodiment, TM insertion mechanism 112 can include a mechanism for rapidly recovering from security attacks, such as worms, viruses, Trojan horses, etc., that reboots the affected system or systems into a synthetic volume created prior to the first TM regarding the security event. For example, when the integrity of host 102 is suspected, a synthetic volume can be constructed based on the retained association between a security event that was earlier generated and an entry in repository 114. Host 102 and repository 114 can be accessed from an independent management system 118, which remotely reboots hosts 102 from the synthetic volume. The reboot into the synthetic volume can be either read-only or read-write. Also, all backup history subsequent to the TM can be erased from the system, which is referred to as forward pancaking. Alternatively, all the data can be retained as evidence for forensic analysis.

Additionally, TM insertion mechanisms 112 can include a data forensic system in which a time domain logical block analyzer can be used to query synthetic volumes for I/O signatures indicative of attacks. The analyzer may involve specific knowledge of specific file system or data system volume formats or may study generic block I/O patterns. The analyzer can also have knowledge on the internal data organization characteristic of repository 114, permitting it to perform optimized analysis.

In one exemplary embodiment, repository 114 can be isolated from data set 104 and host 102. A stronger security can then be applied to repository 114 than to data set 104 and host 102 without affecting data set 104 or host 102. For example, TM insertion mechanism 112 can include an information security protection mechanism created by Chinese walling repository 114 of a continuous backup system. By isolating backup volumes from all direct access other than through the backup system, the continuous backup data is protected from security threats. This is accomplished by only ever appending data being protected to the large collection of data maintained by the continuous backup system. Thus, the continuous backup system prohibits a given data block from ever being written over. When such an operation occurs, the original data block is retained and the new data for that block is retained in a separate block, appropriately noted in metadata by the continuous backup system, so that either version could be recovered in the context of the complete collection of blocks being protected, depending upon what instance of time one would like to view that collection.

One example of the importance of this feature is that in many classic malicious information security attacks, a malicious intruder would seek to wipeout by deleting or overwriting crucial information security logs maintained by the operating system or some information security device or application. By protecting such logs in the continuous backup system, every bit of data ever maintained in such logs at any instance in time could be made available for forensic analysis, and any malicious attempts to overwrite it would be thwarted by the system.

Figure 3:
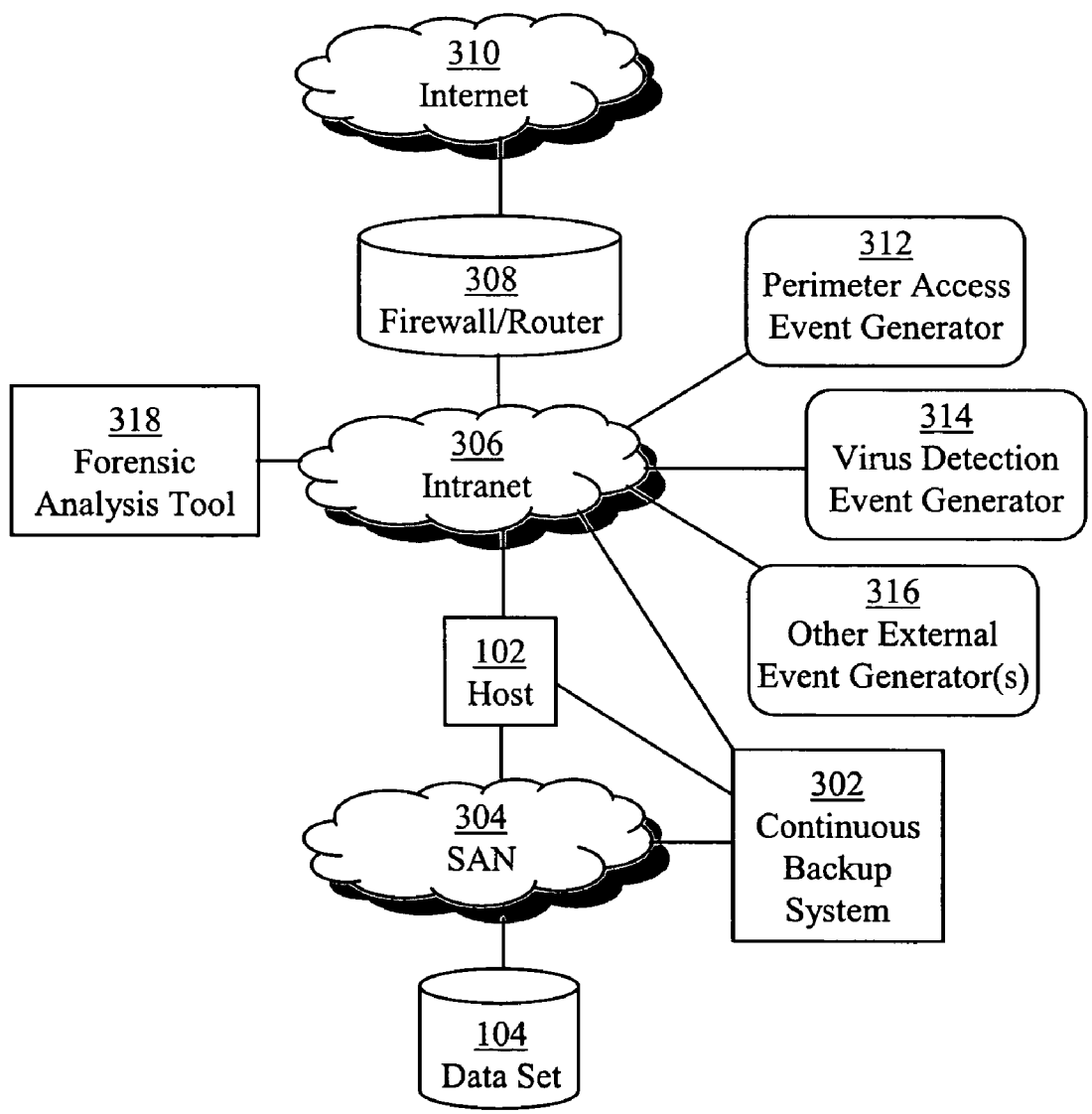
FIG. 3 is a block diagram of another exemplary data storage system with an integrated information security system.

With reference to FIG. 3, an exemplary block diagram is depicted of a continuous backup system 302 integrated with an information security system. As depicted in FIG. 3, host 102 can access data set 104 through storage area network (SAN) 304. Continuous backup system 302 can capture all writes to data set 104 from SAN 304 and copy them to various logs, which is the normal function of continuous backup system 302 in its capacity as a data protection system. As described above, it should be noted that writes to data set 104 can be captured using various known techniques.

In addition to logging the writes, in the present exemplary embodiment, continuous backup system 302 logs external events. Thus, continuous backup system 302 can include TM insertion mechanism 112 (FIG. 1), repository 114 (FIG. 1) and event log 116 (FIG. 1). These external events can be generated by security products (e.g., perimeter access event generator 312 and virus detection event generator 314) and other external event generator(s) 316 distributed throughout the enterprise, and are received by continuous backup system 302. As depicted in FIG. 3, in the present exemplary embodiment, host 102, perimeter access event generator 312, virus detection event generator 314, other external event generator(s) 316, and continuous backup system 302 are connected to intranet 306. Intranet 306 is connected to internet 310 through firewall/router 308.

With reference to FIG. 2, in the present exemplary embodiment, repository 114 with entries 202, event log 115 with events 208, and the association between events 208 and entries 202 are stored in a single annotated log that holds both write data and metadata, including in this instance security data. To insure that the annotated log is not compromised, the continuous backup system is configured to allow only appending to the annotated log, amongst other things.

The annotated log can be used to identify any "restore points" or any other points of interest, especially for forensic analysis. With reference to FIG. 3, continuous backup system 302 can process the data captured in the annotated log to reconstitute an image of a disk volume as it was at the restore point (a synthetic volume constructed at the restore point). Continuous backup system 302 can start at any marked or arbitrary point in time indicated by the operator and search in the annotated log until it arrives at a point corresponding to a TM. In this way, the restore time can be close to the time of security breach as possible, and also contain a consistent data set as guaranteed by the TM.

Additionally, continuous backup system 302 can take into account any potential delay between a security breach and receipt of notification of the security breach. The system is aware of all TMs in all managed collections of blocks, and time values synchronized across an enterprise are used as timestamps. Thus, continuous backup system 302 can suggest an even earlier point to restore to in order to obtain a synthetic volume that is not tainted by the security breach, or at the very least, have a robust management console that presents the best current knowledge of the data being managed and relevant TMs to the user so they can make educate decisions.

In one exemplary embodiment, continuous backup system 302 can initiate post-restore verification actions by invoking security tools to scan the synthetic volume in order to guarantee that the synthetic volume is not tainted by the security breach. If the post-restore scan indicates that the synthetic volume has been tainted, an earlier restore point can be chosen to iteratively arrive at an untainted synthetic volume. Once a restore point has been identified that indicates an untainted restore, the log contents beyond that restore point can be erased to prevent instantiation of tainted synthetic volumes.

Additionally, forensic analysis can be carried out post-breach by creating several synthetic volumes at different times and comparing their contents in order to construct the sequence of events that led to the breach. Alternatively, forensic analysis can be carried out by continuous backup system 302 delivering to a forensic analysis tool 318 (through a defined interface) the complete log content, which contains complete temporal sequence of all write activity to disk volumes and the captured event data described above. Forensic analysis tool 318 can be an application, hardware, or a combination of application and hardware.

To reduce load on processors and storage capacity, forensic analysis operations can be offloaded and parallelized to expedite forensic analysis. In such a scenario, continuous backup system 302 could be enhanced to perform forensic functions in a more efficient fashion than if it generated complete synthetic volumes of a managed collection of blocks at a point in time and presented it to some third party processor to perform forensic analysis on it. For example, disk drives with powerful microprocessors can be used. The blocks can be organized to be a queriable database. SQL capabilities can be placed in the logic of the microprocessor onboard the disk drive and an SQL can be run on all of the data similar to some parallel processor to the host processor. Thus, the host would not need to do the processing, and the data in the drive would not have to be transferred to the host—two very expensive options. Through a modified protocol, the disk drive would only present the results of the SQL, not all of the data in the disk.

Figure 4:
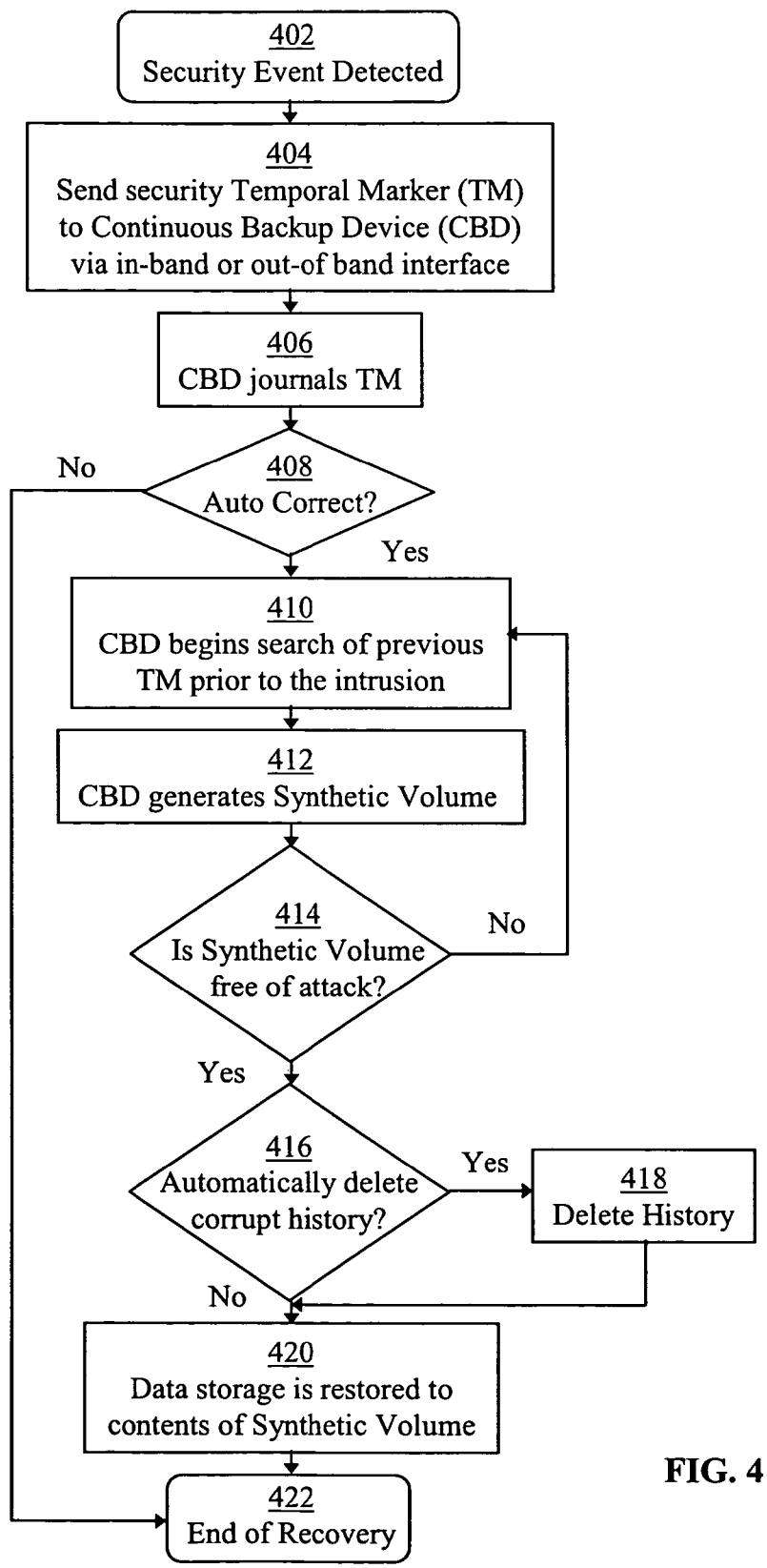
FIG. 4 is flow chart of the operations performed by the exemplary data storage system depicted in FIG. 3.

With reference to FIG. 4, an exemplary flowchart is depicted of operations performed by a continuous backup system and information security system. In particular, in step 402, a security event is detected. In step 404, a security temporal marker (TM) is sent to the continuous backup system via in-band or out-of band interface. In 406, the continuous backup system journals the TM. In step 408, a determination is made as to whether the "Auto Correct" criterion applies. If no, then in step 422, the recovery is ended. If the determination is yes, in step 410, the continuous backup system begins a search of previous TMs prior to the intrusion. In step 412, the continuous backup system generates synthetic volume. In 414, a determination is made as to whether the synthetic volume is free of attack. If it is not, then steps 410, 412, and 414 are iterated using an earlier TM. If it is, then in step 416, a determination is made as to whether the corrupt history should be automatically deleted. If yes, then in step 418, the history is deleted. If no or after completing step 418, the data storage is restored to contents of the synthetic volume. In step 422, the recovery is ended. It should be noted that the operations depicted in FIG. 4 can be performed under the control of a knowledgeable information security system rather than strictly as an automated process.

Although various exemplary embodiments have been described, it will be appreciated that various modifications and alterations may be made by those skilled in the art.

We claim:

1. A method of associating events with the state of a data set, the data set being a collection of addressable storage that is modified by a host computer system writing to specific addresses, the method comprising:
   capturing copies of writes made by the host to the data set, each captured write having write data and address;
   assigning sequence information to the captured writes to organize the captured writes in the time sequence in which the writes were captured;
   assigning absolute time information to each captured write;
   retaining each captured write as an entry in a repository, the entry including write data, address, sequence information, and absolute time information;
   associating an event to a specific entry in the repository, wherein the event is not derived from the specific entry to which it is associated; and
   retaining the association for subsequent use.

2. The method of claim 1:
   organizing the retained associations for subsequent analysis.

3. The method of claim 1, wherein the captured writes retained in the repository are not overwritten by each other or any subsequently retained write.

4. The method of claim 3, wherein the data set is protected by a continuous data protection system.

5. The method of claim 1, further comprising:
   associating the event with information pertinent to the event.

6. The method of claim 5, wherein the event is generated by a first application that is generating data associated with the data set.

7. The method of claim 5, wherein the event is generated by a second application that is not generating data associated with the data set.

8. The method of claim 7, wherein the event generated by the second application is a security event that relates to the data in the data set, and wherein the second application has no direct knowledge regarding the data in the data set.

9. The method of claim 8, further comprising:
   when the integrity of the host is suspected, constructing a specific collection of data (a synthetic volume) that represents the data set at a point in time based on the retained association between the security event that was generated by the second application and the specific entry in the repository.

10. The method of claim 1, further comprising:
    constructing a specific collection of data (a synthetic volume) that represents the data set at a specified point in time.

11. The method of claim 10, wherein the synthetic volume represents the data set at a specified point in time as indicated by sequence information associated with an entry in the repository.

12. The method of claim 10, wherein the synthetic volume represents the data set at a specified point in time as indicated by absolute time information associated with an entry in the repository.

13. The method of claim 10, wherein the synthetic volume represents the data set at a specified point in time as indicated by an event associated with an entry in the repository.

14. The method of claim 10, wherein the synthetic volume is constructed based on the retained association between the security event that was generated by the second application and the specific entry in the repository.

15. The method of claim 14, wherein the specified point in time corresponds to an event.

16. The method of claim 15, further comprising:
    accessing the repository and the host from an independent management system.

17. The method of claim 16, further comprising:
    from the independent management system, remotely rebooting the host from a specific synthetic volume.

18. The method of claim 10, further comprising:
    constructing multiple synthetic volumes; and
    comparing the multiple synthetic volumes to determine which one represents a desired state of the data set at an initially unknown point in time.

19. The method of claim 18, further comprising:
    performing forensic analysis of the multiple synthetic volumes using a forensic analysis tool that is integrated with the repository.

20. The method of claim 1, further comprising:
    performing a forensic analysis based on an organizational characteristic of information in the repository and an event log.

21. The method of claim 20, further comprising:
    placing specialized forensic analysis processors that are able to perform the forensic analysis.

22. The method of claim 1, wherein the repository is located separate from the data set and the host, and wherein stronger security is applied to the repository than to the data set and the host without affecting the data set or the host.

23. The method of claim 22, wherein the repository is an append-only log where prior writes, even to the same address in the data set, are not over-written.

24. The method of claim 1, wherein the event can be associated by an in-band mechanism that inserts a vendor-specific packet into the same stream by which the captured writes are introduced into the repository.

25. The method of claim 1, wherein the event can be associated by an out-of-band mechanism that communicates with the repository using a mechanism other than the same stream by which the captured writes are introduced into the repository.

26. A system for associating events with the state of a data set, the data set being a collection of addressable storage that is modified by a host computer system writing to specific addresses, the system comprising:
  a temporal marker insertion mechanism embodied in a computer-readable storage medium, the temporal marker insertion mechanism configured to capture copies of writes made by the host to the data set, each captured write having write data and address,
  wherein each captured write is assigned sequence information to organize the captured writes in the time sequence in which the writes were captured, and
  wherein each captured write is assigned absolute time information;
  a repository configured to retain each captured write as an entry in the repository, the entry including write data, address, sequence information, and absolute time information; and
  an event log embodied in a computer-readable medium, wherein an event in the event log is associated to a specific entry in the repository, wherein the event is not derived from the specific entry to which it is associated, and wherein the association is retained for subsequent use.

27. The system of claim 26, further comprising a continuous data protection system that protects the data set.

28. The system of claim 27, wherein the captured writes retained in the repository are not overwritten by each other or any subsequently retained write.

29. The system of claim 26, wherein event log includes information pertinent to the event.

30. The system of claim 29, wherein the event is generated by a first application that is generating data associated with the data set.

31. The system of claim 29, wherein the event is generated by a second application that is not generating data associated with the data set.

32. The system of claim 31, wherein the event generated by the second application is a security event that relates to the data in the data set, and wherein the second application has no direct knowledge regarding the data in the data set.

33. The system of claim 32, further comprising:
  a synthetic volume constructed when the integrity of the host is suspected, the synthetic volume construed from a specific collection of data that represents the data set at a point in time based on the retained association between the security event that was generated by the second application and the specific entry in the repository.

34. The system of claim 26, further comprising:
  a synthetic volume that represents the data set at a specified point in time that corresponds to an event.

35. The system of claim 26, further comprising:
  an independent management system that accesses the repository and the host, wherein the independent management system is configured to remotely reboot the host from a specific synthetic volume constructed from the repository.

36. The system of claim 35, further comprising:
  a forensic analysis tool integrated with the repository, wherein the forensic analysis tool is configured to perform forensic analysis of multiple synthetic volumes.

37. The system of claim 26, further comprising:
  a forensic analysis tool configured to perform forensic analysis based on organizational characteristics of information in the repository and the event log.

38. The system of claim 37, wherein the forensic analysis tool includes specialized forensic analysis processors.

39. The system of claim 26, wherein the repository is located separate from the data set and the host, and wherein stronger security is applied to the repository than to the data set and the host without affecting the data set or the host.

40. The system of claim 39, wherein the repository is an append-only log where prior writes, even to the same address in the data set, are not over-written.

41. The system of claim 26, further comprising:
  an in-band mechanism configured to associate an event by inserting a vendor-specific packet into the same stream by which the captured writes are introduced into the repository.

42. The system of claim 26, further comprising:
  an out-of-band mechanism configured to associate an event by communicating with the repository using a mechanism other than the same stream by which the captured writes are introduced into the repository.

43. A computer-readable storage medium containing computer executable instructions for causing a computer to associate events with the state of a data set, the data set being a collection of addressable storage that is modified by a host computer system writing to specific addresses, comprising instructions for:
  capturing copies of writes made by the host to the data set, each captured write having write data and address;
  assigning sequence information to the captured writes to organize the captured writes in the time sequence in which the writes were captured;
  assigning absolute time information to each captured write;
  retaining each captured write as an entry in a repository, the entry including write data, address, sequence information, and absolute time information;
  associating an event to a specific entry in the repository, wherein the event is not derived from the specific entry to which it is associated; and
  retaining the association for subsequent use.

* * * * *